Figure 1:
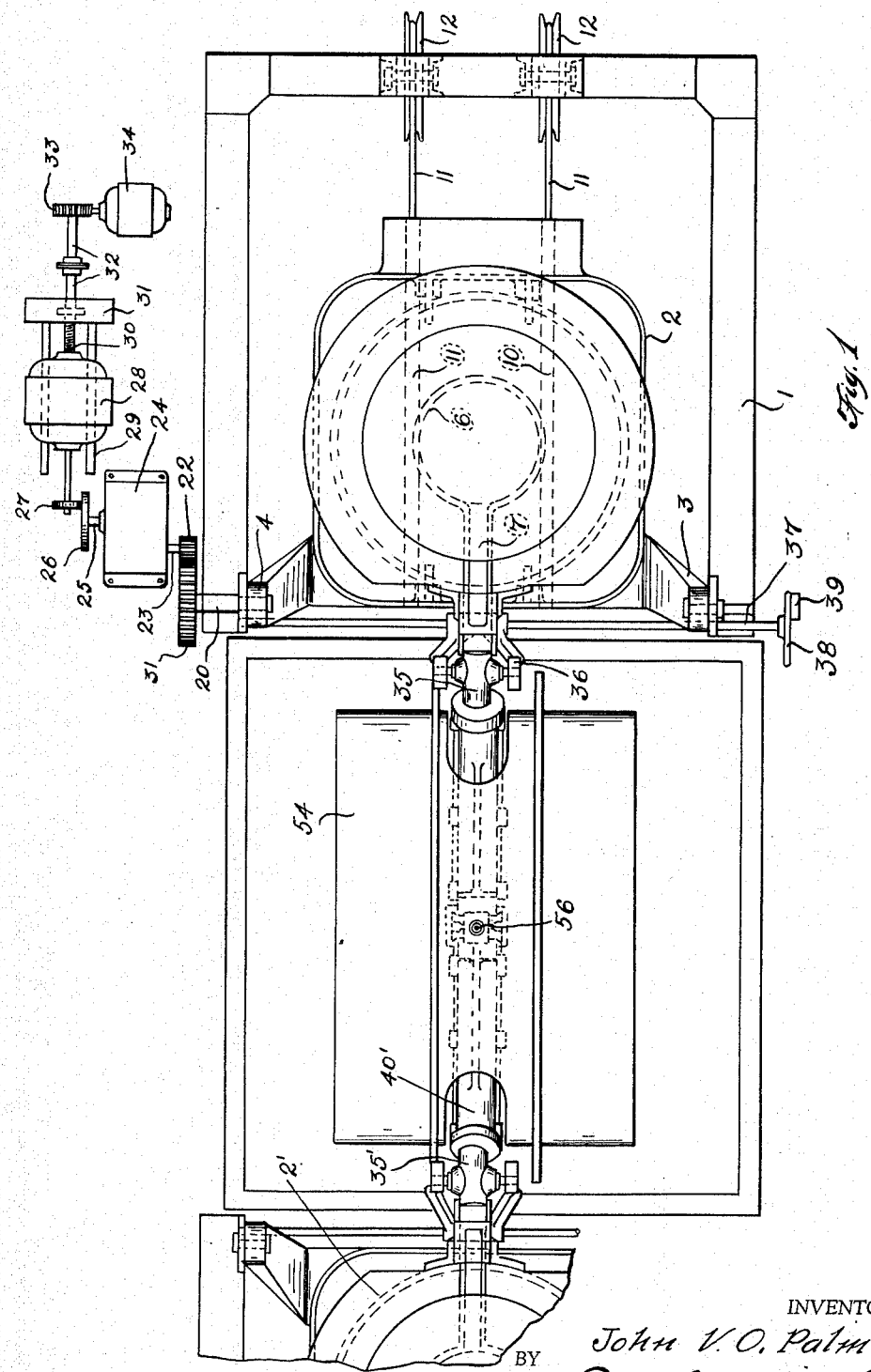

Aug. 19, 1941.    J. V. O. PALM    2,252,945
METHOD OF AND APPARATUS FOR MAKING COMPOSITE BEARING STRIP
Filed Oct. 15, 1936    3 Sheets-Sheet 1

INVENTOR.
John V. O. Palm
BY Fay, Oberlin & Fay
ATTORNEYS.

Patented Aug. 19, 1941

2,252,945

UNITED STATES PATENT OFFICE 2,252,945

METHOD OF AND APPARATUS FOR MAKING COMPOSITE BEARING STRIP

John V. O. Palm, Cleveland Heights, Ohio, assignor to The Cleveland Graphite Bronze Company, Cleveland, Ohio, a corporation of Ohio Application October 15, 1936, Serial No. 105,776

6 Claims. (Cl. 22—57.2)

The present invention relates to a method of and an apparatus for making a composite bearing strip. More particularly, the invention pertains to the production, by a continuous mode of operation, of a composite strip having one layer composed of a backing metal such as steel, and another layer bonded and joined thereto and composed of a bearing metal such as babbitt or plastic bronze.

The fundamental object of the invention is to so control the rate of flow of a fluid, molten bearing metal upon the moving backing metal strip, so that the thickness of the applied bearing metal layer will be determined, evenly distributed and uniformly maintained. By reason of such control of the rate of application of the bearing metal to the backing metal strip, it is possible to obtain a resultant composite strip wherein the thickness of the bearing metal layer more closely approaches the required thickness in the finished product, viz., a cylindrical or semi-cylindrical bearing shell. By virtue of so closely controlling the thickness of the originally applied bearing metal layer, the following advantages result: elimination of excess machining, decrease in the loss of bearing metal, and the production of a bearing metal layer having better metallurgical properties. The application of the bearing metal layer in the nature of the plastic bronze, in the fabrication of a composite bearing strip heretofore has not been controlled and maintained within substantially close ranges of thickness, with the resultant inconvenience and difficulty that excessive machining and removal of excess metal has been necessary in order that the final product will conform to the specified precision limits. Such removal of excess metal not only requires additional time and expense, but produces a substantial loss in the handling and reclaiming of metal turnings and scrap.

When the thickness of the applied bearing metal layer is closely controlled as in the present invention, and the application of a layer of excess thickness eliminated, there is a substantial inhibition in the bearing metal of the tendencies to segregation, liquation, oxidation, vaporization and grain growth. It is obvious that the smaller the amount of molten bearing metal applied, as compared to the haphazard application of metal of excess thickness, that the rate of solidification of the molten metal and the length of time in which the metal is maintained in the molten state will be correspondingly decreased. The result is that the segregation or liquation of an immiscible lower melting point constituent such as lead in plastic bronze is inhibited. Similarly, the opportunities for oxidation and vaporization of bearing metal alloy constituents are reduced. Grain growth of the crystalline structure of the bearing metal, due to relatively slower cooling is also retarded.

The apparatus embodying the principle of the invention provides means for pouring molten bearing metal from a melting pot or reservoir at a uniform rate of flow during the variation in the liquid level of the molten metal in the melting pot and during the variation in the angle of pouring tilt of the pot. Additional objects in the construction of the apparatus are to provide means to prevent splashing and spattering of the molten bearing metal upon its contact with the backing strip and to obtain a lateral distribution of the molten bearing metal over the face of the backing strip.

Additional objects and advantages shall become apparent as the following description proceeds.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 2:
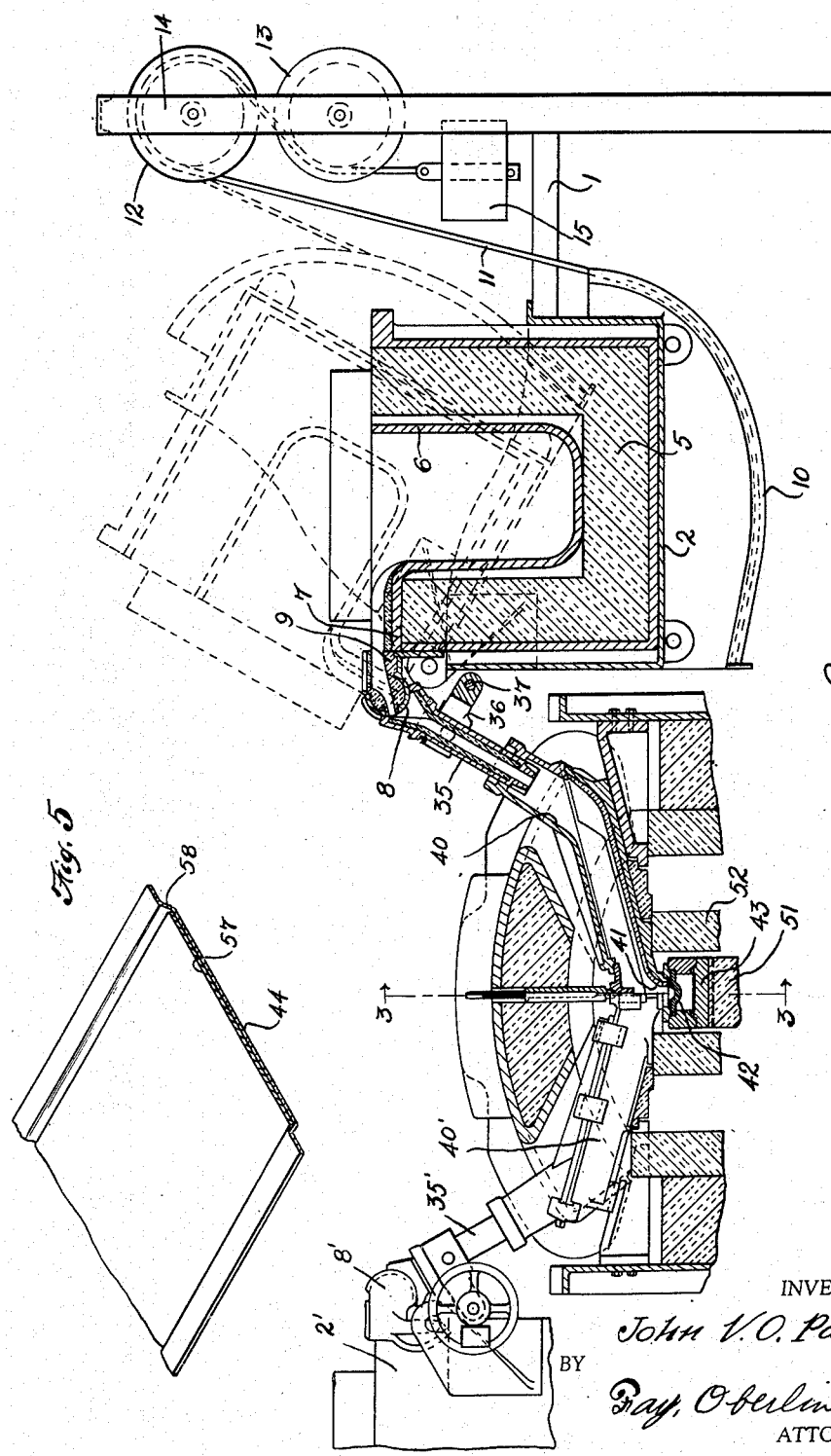
Figure 3:
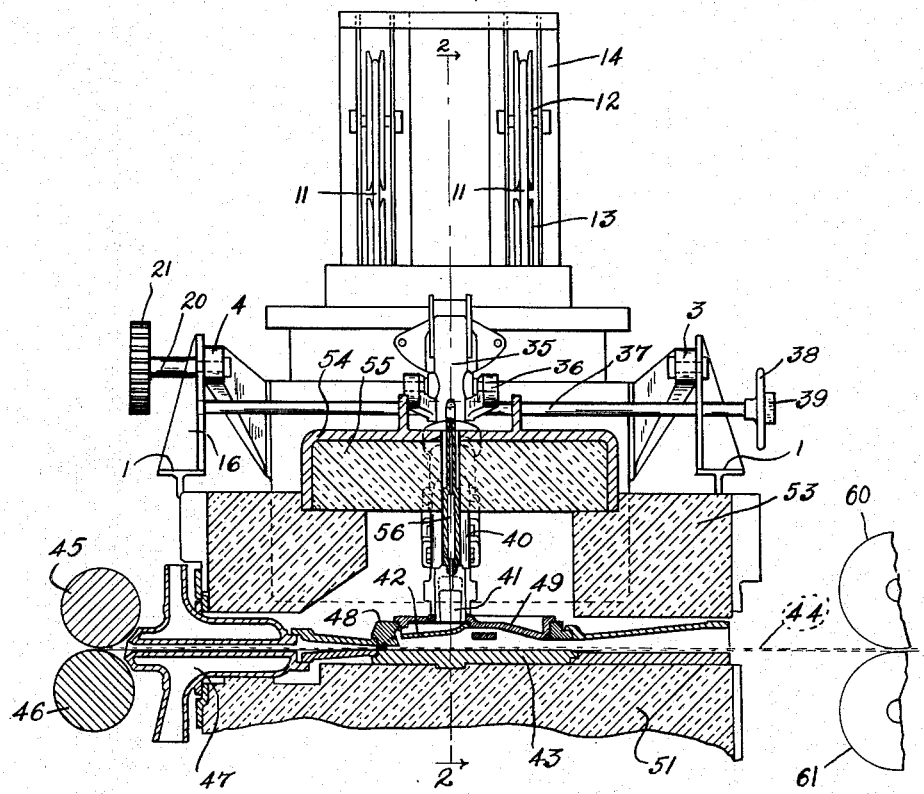
Figure 4:
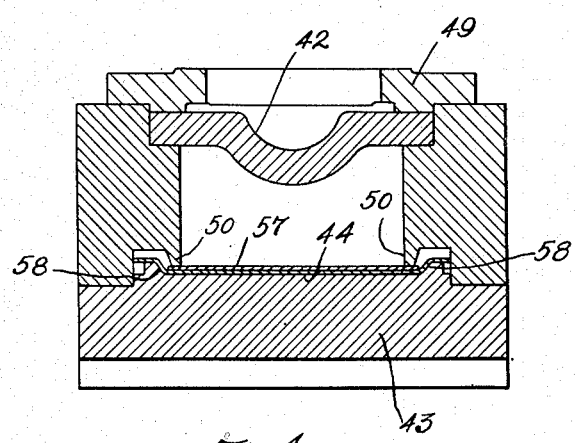

In said annexed drawings:

Fig. 1 is a top plan view of the apparatus embodying the principle of the invention; Fig. 2 is a vertical, sectional view of Fig. 1; Fig. 3 is a sectional view taken substantially along line 3—3 of Fig. 2; Fig. 4 is an enlarged, transverse, sectional view of the molten metal deflector plate; Fig. 5 is a perspective view of the composite bearing strip.

Now referring more particularly to the drawings, the apparatus shown therein includes a supporting frame 1 upon which the melting pot housing 2 is pivotally mounted by means of the trunnion arms 3 and 4. The inner walls of the housing 2 are lined with a refractory, insulating material as indicated at 5. A molten metal reservoir or melting pot 6 is adapted to be received in the interior of the housing 2. A pouring channel 7 leads from the melting pot 6 and terminates in a spout 8 having a spherical surface and located beyond the edge of the housing 2. The pouring channel 7 and spout 8 are preferably lined with a refractory cement as indicated at 9.

A pair of curved channels or runners 10 are located underneath the housing 2 and are adapted to serve as bearing guides for the cables 11 which have one end anchored to the left hand end of the runners 10 (with respect to Fig. 2) and the other end connected to a counter-balance 15. The cables 11 travel over the pulleys 12 and idler pulleys 13 mounted upon the vertical frame 14. The last described mechanism is for the purpose of facilitating the tilting movement of the melting pot housing 2 about the pivot points of its trunnion arms 3 and 4.

Directing attention particularly to Fig. 1, the shaft 20 extends from the trunnion arm 4 through the supporting bracket 16 on the frame 1. The shaft 20 carries a gear 21 which meshes with a smaller gear 22 on the shaft 23 of a re-reduction gear unit 24. The high speed shaft 25 of the reduction gear unit 24 carries a face plate 26 which is in turn engaged by a friction wheel drive 27 from the drive motor 28. The drive motor 28 is mounted upon a slidable bed 29 and is also engaged by a feed screw 30 which is locked against longitudinal movement by means of suitable thrust bearings in the base block 31. The feed screw 30 is connected by means of a coupling 32 to a worm and gear drive 33, driven by the motor 34. The purpose of the last described mechanism is to tilt the housing 2 and melting pot 6 about the trunnion pivots at a progressively increasing rate of speed whereby the rate of flow of molten metal out of the pouring spout 8 will be constant, regardless of the variation of angular positions through which a housing 2 and pot 6 are tilted. The drive motor 28 operates to rotate the shaft 20 through the friction drive 27, reduction gear unit 24, and gears 22 and 21. The feed screw drive motor 34 slowly rotates the feed screw 30 and thereby moves the drive motor 28 and its friction drive wheel 27 from a position of low speed transmission to high speed transmission. The face plate 26 and friction drive wheel 27 thereby constitute a variable speed transmission, which by reason of the movement of the motor 28 operates to tilt the housing 2 and melting pot 6 at a progressively increasing rate of speed.

After each pouring of the molten bearing metal from the melting pot 6, the motor 28 is reversed to restore the housing 2 and melting pot 6 to normal position, and the motor 34 also reversed to turn the friction wheel 27 to its original starting position at low speed transmission ratio. It is to be understood that the feed screw 30 is rotated at such a speed as to move the friction wheel from low to high speed transmission ratios during the same period of time that the housing 2 and melting pot 6 move from normal to fully tilted position as shown in dotted lines in Fig. 2.

A hollow connector 35 is movably supported by means of the yoke 36 carried by the horizontal shaft 37. The shaft 37 is journalled in the frame 1 and has a hand wheel 38 positioned on its outer end. An over-balanced weight 39 on the hand wheel 38 is for the purpose of urging the yoke 36 and connector 35 in an upward direction so that the upper end of the connector 35 which has an opening adapted to register with the spherical contour of the pouring spout 8, is maintained in close fitting contact with the latter.

The lower end of the connector 35 telescopically fits within the upper end of the pouring chute 40. The lower end of the pouring chute 40 terminates in an opening 41 immediately above the deflector plate 42. The deflector plate 42 is located just above the base plate 43 over which the backing metal strip 44 is moved. As shown in Fig. 3, a pair of heating rolls 45 and 46 contact the backing strip 44 which is drawn through the preheating muffle 47 and underneath the end of the deflector plate 42, and the backing strip 44 is drawn through the apparatus by means of the rolls 60 and 61 which are located at the delivery end. The rolls 60 and 61 are driven through a variable speed transmission (not shown) whereby their rate of rotation and consequently the speed of travel of the strip 44 may be varied. An abutment 48 is spaced a slight distance from the end of the deflector plate 42 and extends downwardly to a position substantially in contact with the upper face of the backing strip 44. The lower end 41 of the pouring chute 40 and the deflector plate 42 are enclosed in a housing 49.

The pouring chute 40, deflector plate 42 and bearing strip base plate 43 are suitably insulated by means of insulating walls as indicated at 51, 52 and 53. A removable cover 54 lined with insulating material as at 55 permits access to the several parts located adjacent the pouring area.

A conduit 56 extends through the cover 54 and terminates adjacent the lower end 41 of the pouring spout 40. The conduit 56 is for the purpose of introducing a non-oxidizing or reducing gas to the locality where the bearing metal is applied to the backing strip 44 and also to permeate the interior of the pouring chute 40, connector 35, spout 8, and melting pot 6 with a non-oxidizing atmosphere.

A duplicate housing 2' carrying another melting pot and having a pouring spout 8', connector 35' and pouring chute 40' is also provided at a position opposite the similar parts hereinabove described and the lower end of the pouring chute 40' terminates in a common opening with the opening 41 of the pouring chute 40. In this manner full melting pots may be assembled and empty ones removed from the housing in alternate sequence without interrupting the continuous operation of the machine.

The method of fabricating the composite bearing metal strip, inherent in the operation of the above described apparatus, should now be apparent. The backing metal strip 44 is moved at a predetermined rate of speed controlled by the speed of rotation of the rolls 60 and 61. Simultaneously the molten bearing metal is poured from the melting pot 6 at a predetermined, uniform rate of flow. A corresponding increase or decrease in the speed or movement of the backing strip 44 or in the rate of flow of the molten bearing metal from the melting pot 6 will thereby be effective to determine the thickness of the bearing metal layer applied to the backing strip 44. By means of control of these last mentioned variable factors, it is possible to regulate and determine the thickness of the applied bearing metal there within close limits. Solidified bearing metal on the strip after it passes the point where the molten metal is applied, and the direction of movement of the strip, being opposite to that of the applied metal, operate to longitudinally confine the flow of molten metal. The downwardly depending flanges 50 (Fig. 4) and the flanges 58 on the edges of the backing strip 44 serve as means for laterally confining the flow of the applied molten metal.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:

1. In a composite metal strip machine, the combination of means for moving a backing metal strip, a molten metal reservoir, tiltable supporting means for said reservoir, variable speed power means connected to said supporting means and adapted to tilt said reservoir and thereby pour molten metal therefrom at a uniform, predetermined rate of flow, and conduit means leading from said reservoir to a point adjacent said backing strip.

2. In a composite metal strip machine, the combination of means for moving a backing metal strip, a molten metal reservoir, tiltable supporting means for said reservoir, variable speed power means connected to said supporting means and adapted to tilt said reservoir and thereby pour molten metal therefrom at a uniform, predetermined rate of flow, conduit means leading from said reservoir to a point adjacent said backing strip, and a deflecting plate positioned at the discharge end of said conduit means and immediately above said backing strip.

3. In a composite metal strip machine, the combination of means for moving a backing metal strip, a molten metal reservoir, a supporting frame for said reservoir, pivotal means for mounting said frame, a discharge spout on said reservoir extending beyond said pivotal means, variable speed means for tilting said frame and said reservoir about the pivotal point of support of said pivotal means whereby to pour molten metal from said discharge spout at a uniform, predetermined rate of flow, a conduit leading from said discharge spout at a point adjacent said backing strip, and means for variably regulating the length of said conduit.

4. In a composite metal strip machine, the combination of means for moving a backing metal strip, a molten metal reservoir, a supporting frame for said reservoir, pivotal means for mounting said frame, a discharge spout on said reservoir extending beyond said pivotal means, variable speed means for tilting said frame and said reservoir about the pivotal point of support of said pivotal means whereby to pour molten metal from said discharge spout at a uniform, predetermined rate of flow, a conduit leading from said discharge spout at a point adjacent said backing strip, means for variably regulating the length of said conduit, and a deflecting plate positioned at the discharge end of said conduit and immediately above said backing strip.

5. In a composite metal strip machine, the combination of means for moving a backing metal strip, a molten metal reservoir, a supporting frame for said reservoir, pivotal means for mounting said frame, a discharge spout on said reservoir extending beyond said pivotal means, variable speed means for tilting said frame and said reservoir about the pivotal point of support of said pivotal means whereby to pour molten metal from said discharge spout at a uniform, predetermined rate of flow, a conduit leading from said discharge spout at a point adjacent said backing strip, means for variably regulating the length of said conduit, a deflecting plate positioned at the discharge end of said conduit and immediately above said backing strip, and a gas conduit connected to the lowermost end of said first-named conduit.

6. In a continuous method of making a composite strip, the steps which consist in pouring molten metal having a melting point of the order of the melting point of plastic bronze onto a moving backing strip at a uniform predetermined rate, moving said backing strip at a predetermined uniform rate as the molten metal is being poured thereon, the rapidity of pouring and of strip movement being so controlled as to obtain a composite strip wherein the thickness of the sound usable portion of the applied layer is substantially uniform and closely approaches the required thickness of said applied metal in the products made from said strip.

JOHN V. O. PALM.